RONALD E. RICHARDSON
BY: Cushman, Darby & Cushman
ATTORNEYS

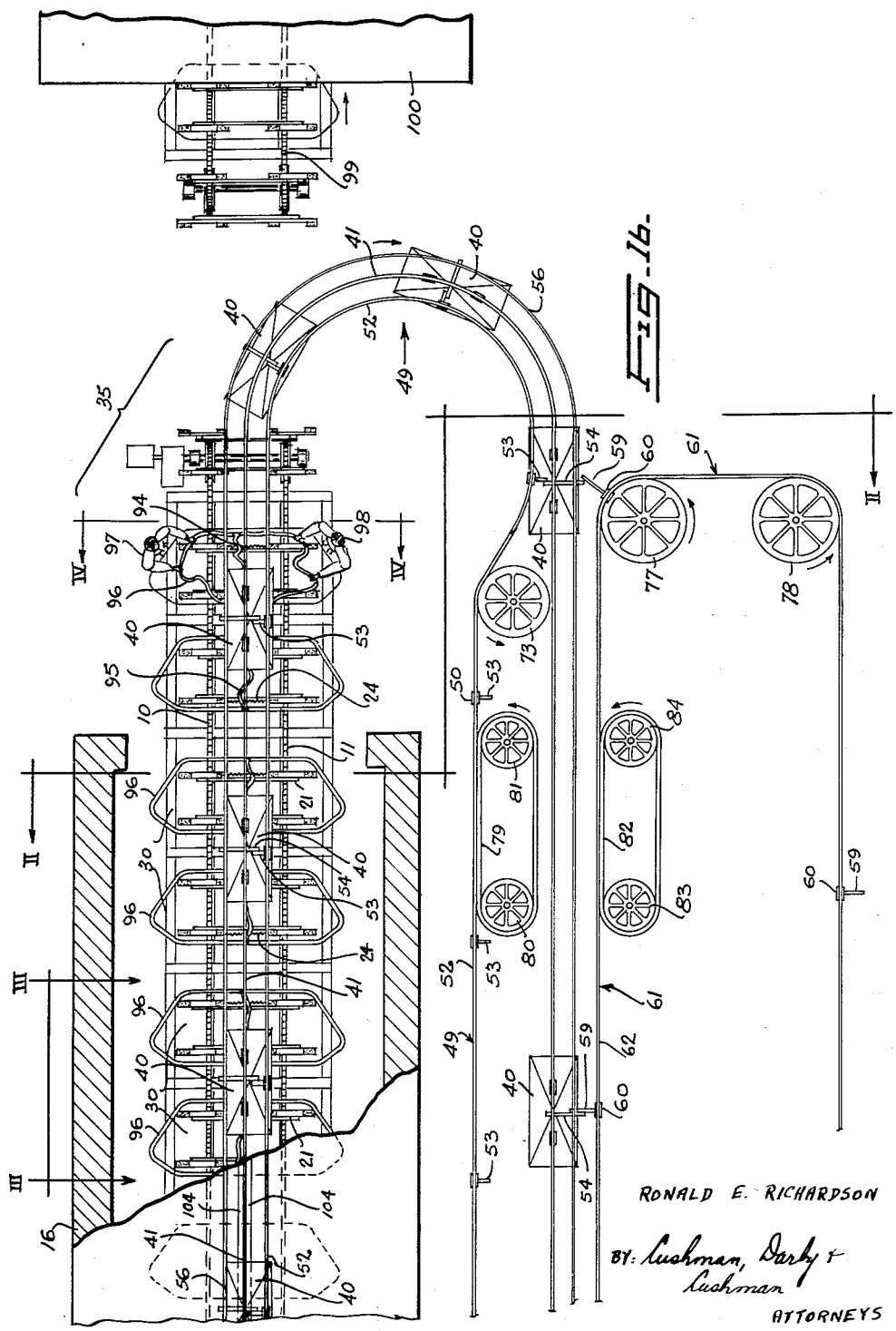

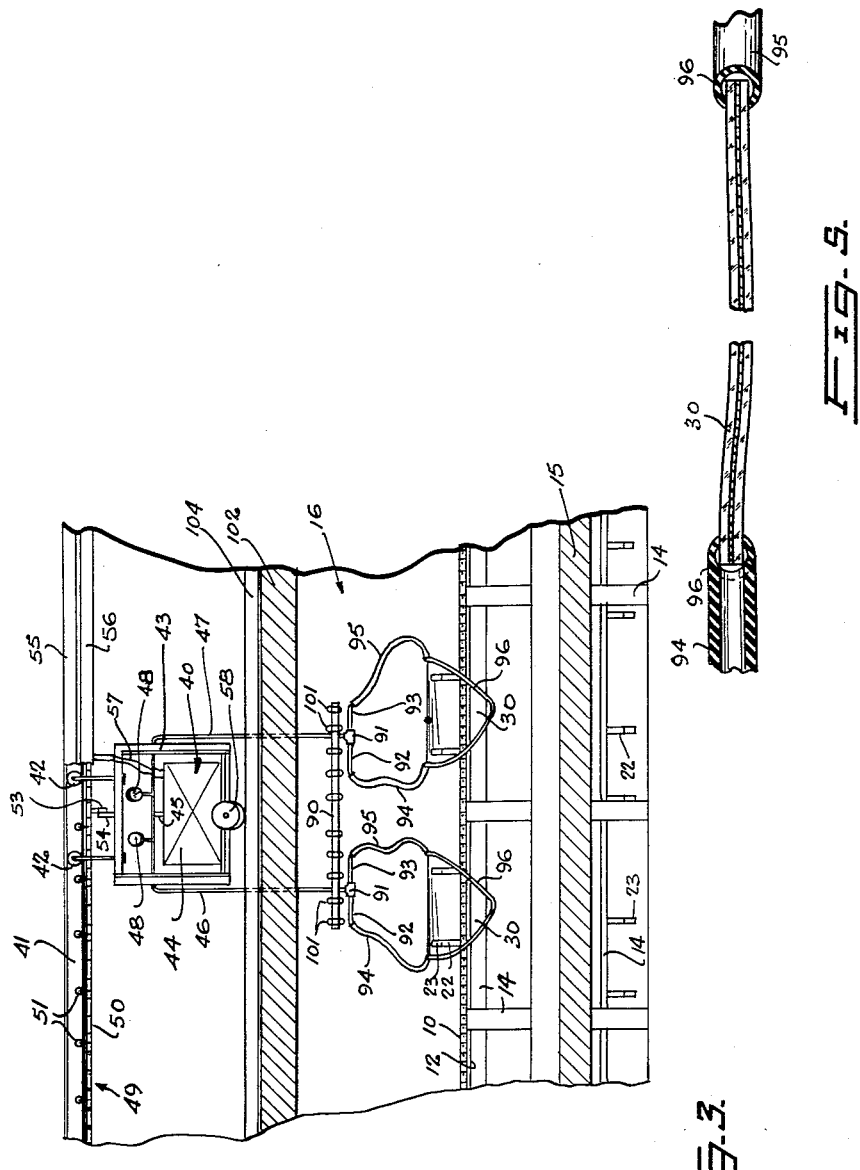

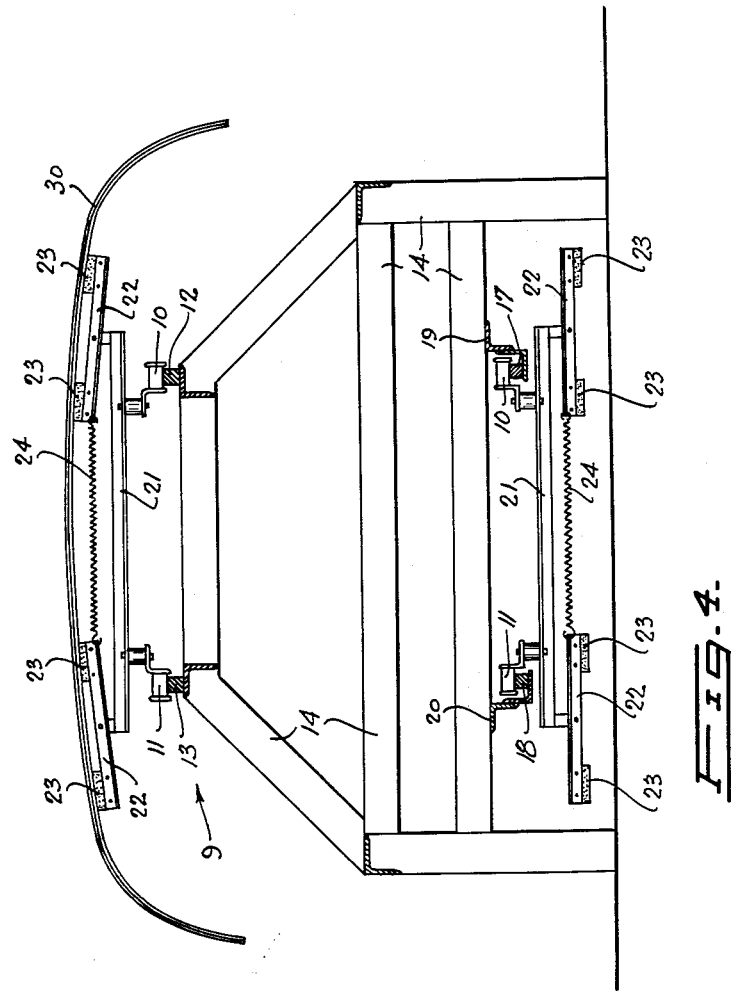

United States Patent Office 2,994,629
Patented Aug. 1, 1961

2,994,629
METHOD AND APPARATUS FOR BONDING LAMINATED GLASS
Ronald E. Richardson, Oshawa, Ontario, Canada, assignor to Pittsburgh Plate Glass Company, Pittsburgh, Pa.
Filed Jan. 8, 1959, Ser. No. 785,659
Claims priority, application Canada Dec. 19, 1958
11 Claims. (Cl. 154—2.7)

This invention relates to an apparatus and method for the pressing of curved laminated glass assemblies each comprising two matched sheets of curved glass and a thermoplastic interlayer. The invention relates to a preliminary bonding treatment and is especially directed towards apparatus and methods for use in the bonding of large curved laminated glass assemblies for use as windshields in automobiles.

In the manufacture of laminated safety glass, it is customary finally to seal the plastic interlayer to the two sheets of glass by the application of heat and pressure in an autoclave under a fluid such as oil. It is, however, first necessary to bond a marginal area of the assembly before placing it in the fluid in the autoclave, since, if this were not done, fluid would penetrate between the layers and be trapped therein during the final laminating process and would spoil the appearance of the assembly. The preliminary treatment is also necessary to remove as far as possible air trapped between the interlayer and the two sheets of glass, because any excessive amount of air that does remain may appear in the final assembly in the form of air bubbles that are deleterious to the appearance and optical properties of the product.

Various methods have been developed in the preliminary bonding of laminated glass assemblies. Initially, laminated glass assemblies were flat and were treated to effect an initial bonding of the plastic interlayer to the opposing surfaces of the glass sheets by passing the assembly, after gentle heating, through a pair of resilient nipper rolls. With the evolution of curved laminated glass assemblies, modified forms of nipper rolls were developed, and another method was devised that required the assembly to be placed within an oil-resistant plastic bag, after which the bag was sealed and evacuated for removal of air from between the interlayer and the glass sheets. The sealed, evacuated bag with the glass assembly inside was then placed in oil in an autoclave and heated to an elevated temperature while being subjected to an elevated pressure. In this method the entire glass assembly, both surfaces and edges, were entirely enclosed within the bag.

With the development of the more complex shapes of laminated glass assemblies required for automobile windshields, such shapes usually including end portions sharply bent in relation to the main body of the glass (and sometimes also incorporating a transverse curvature in the glass), substantial modifications to nipper rolls became necessary. Even with such modifications, the yield of satisfactory prepressed assemblies was unsatisfactory, the degree of breakage becoming undesirably high. Similarly the use of the plastic bag evacuation method described above for protecting the laminated assembly from penetration of oil during the final pressing was not wholly satisfactory because, during the evacuation of the plastic bag, the glass sheets were pulled against the interlayer when the air was removed and defects in matching of the two sheets of glass would result in breakage. Moreover, the labour required to enclose the assembly in the bag and to remove it after autoclaving is excessive.

Other difficulties also arose and led to the development of apparatus in the form of a flexible, endless, channel-shaped member arranged to enclose the entire peripheral edge of the laminated assembly while engaging a narrow marginal portion of the outer surfaces of the assembly. This member thus provided a conduit adjacent the periphery of the interlayer. A pump was then provided for evacuating such conduit which thus acted as an evacuating member. Apparatus of this character, which represents the most satisfactory method yet developed for prepressing sharply curved laminated assemblies, is described and claimed in Canadian Patent No. 559,783 of Laurence A. Keim, issued July 1, 1958.

The Keim patent also discloses a number of ways in which his evacuating method can be introduced as a step in the complete process of manufacturing windshields. However, all the processes so far devised for employing the Keim method have exhibited one or other of a number of disadvantages, and it is the principal object of the present invention to provide improvements in apparatus and methods for handling laminated assemblies in accordance with the basic teaching of the Keim patent.

In particular it is an object of the invention to provide a method of applying the Keim invention efficiently and economically to a continuous flow manufacturing process, in contradistinction to the batch type of processes exemplified in the Keim patent.

A further object is the provision of a process having improved inherent reliability, so as to minimise stoppages of the process or faulty products resulting from loss or reduction of vacuum.

In prior processes employing the Keim invention, all the numerous evacuating members have been connected to a common vacuum source. This introduces the difficulty that a single leaky member or one faulty set of connections can lower the vacuum throughout the system, thus delaying the processing of all the glass assemblies while the fault is located, and possibly even spoiling all the products, should the fault develop at a critical time in the process. Furthermore, it may be no easy task to locate which is the faulty part of the system. Another difficulty arises in connection with the connection and disconnection of each evacuating member to the vacuum source. This will often give rise to pressure fluctuations in the vacuum line, which may have an undesirable effect on the efficiency of an adjacent evacuating member, especially if the glass assembly associated with such adjacent evacuating member should be at a critical stage in the process when a pressure fluctuation resulting from the connection or disconnection of another assembly is experienced.

To avoid these difficulties, the present invention provides a plurality of separate evacuating units each designed to be associated with one, or a small number, of glass assemblies. Preferably each unit will be connected to two assemblies. If each unit is connected to only one assembly, the number of units becomes uneconomically high. If three assemblies are connected to each unit, the connections become more cumbersome and the trouble caused by a leak is greater. For these reasons, the control of two assemblies by each unit has been chosen as the preferred number, although clearly it can be varied within the scope of the present invention.

In one aspect, the invention may be defined as a continuous flow manufacturing process for removing air from between the sheets of curved laminated glass assemblies and for effecting a bonding between said sheets, comprising disposing said assemblies in spaced relation to form an elongated series; embracing a narrow marginal portion of the outer surfaces of each assembly around its entire periphery only with an evacuating member; connecting each said evacuating member with one of a plurality of power operated evacuating units; operating each power operated evacuating unit to subject said evacuating member to a subatmospheric pressure; moving said series in its direction of extent to move each said assembly along a path through a relatively hot atmosphere while so subjected to subatmospheric pressure; and moving said evacuating units through a relatively cool atmosphere in a direction parallel to said path while operating each said power operated evacuating unit.

In another aspect, the invention is concerned with a method of removing air from between the sheets of a curved laminated glass assembly and for effecting a bond between said sheets, comprising exposing said assembly to a hot atmosphere while subjecting the entire peripheral edge only of said assembly to a subatmospheric pressure, and subsequently exposing said assembly to a hot atmosphere while subjecting said edge to atmospheric pressure.

In a still further aspect, the invention provides apparatus for supporting a curved elongated glass panel, comprising a supporting structure, a first elongated glass-supporting arm mounted on a first part of said structure to pivot about a first generally horizontal axis, a pair of spaced-apart, upwardly projecting, glass-engaging members mounted on said arm each on a respective side of said first axis, a second elongated glass-supporting arm mounted on a second part of said structure displaced from said first part to pivot about a second generally horizontal axis displaced from said first axis, and a pair of spaced-apart, upwardly projecting, glass-engaging members mounted on said second arm each on a respective side of said second axis, at least one glass-engaging member of said second arm being displaced horizontally from a line drawn through the glass-engaging members of said first arm.

Examples of the processes and apparatus with which the invention is concerned are illustrated in the accompanying drawings. In these drawings:

FIGURE 1a is a plan view of apparatus showing a loading station, the first part of a heating oven and some details of the conveyor mechanisms;

FIGURE 1b, which is a continuation of the right-hand end of FIGURE 1a, shows the remainder of the heating oven, partly cut away to reveal the laminated assemblies within, a second oven and further details of the conveyor mechanisms;

FIGURE 3 is a side view of the heating oven with the wall thereof partly broken away to provide a view taken on the line III—III in FIGURE 1b;

FIGURE 4 is a view on an enlarged scale taken on the line IV—IV in FIGURE 1b showing the conveyor structure in more detail; and FIGURE 5 is a section through a glass assembly showing an evacuating member in position.

Figure 1A:
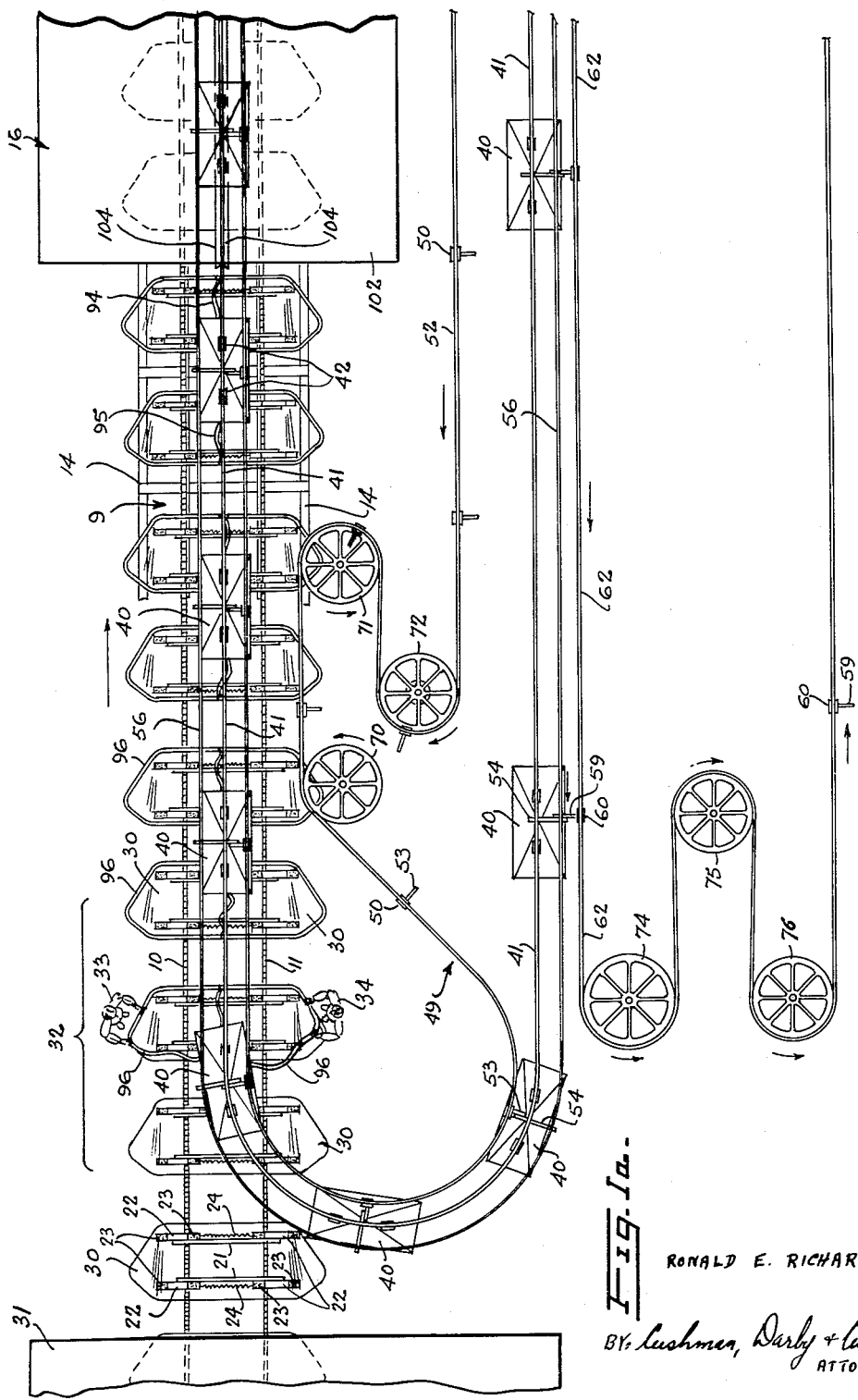

The drawings illustrate a main conveyor 9 for the glass assemblies, such conveyor 9 consisting of a pair of elongated chains 10 and 11 sliding on rails 12 and 13 (see especially FIGURE 4) extending along a support structure 14. The return span of the conveyor travels under the support structure 14 and, in the vicinity of the oven 16 under the floor 15 thereof, such return spans of chains 10 and 11 sliding on rails 17 and 18 supported by brackets 19 and 20 beneath the floor 15. At spaced intervals along the chains 10 and 11 glass supporting structure is provided in the form of transverse support bars 21 secured to chains 10 and 11 to extend across from one such chain to the other, the ends of each such bar, which ends project laterally beyond the chains 10 and 11, serving as supports for pivotally mounted glass-supporting arms 22 each of which has an upwardly projecting glass-engaging member 23 at each end. These members 23 are formed of asbestos or silicone rubber or like heat-resistant material. The inner ends of each pair of arms 22 are joined together by a coil tension spring 24. The bars 21 are so spaced in the longitudinal direction of the conveyor 9 that each windshield assembly 30 is supported by four of the pivotally mounted arms 22. When very wide windshields are being handled, three bars 21 and six arms 22 may desirably be used.

FIGURE 1a shows the conveyor 9 travelling outwardly from the laminating room 31 in which the glass assemblies are stacked. This stacking operation involves the bringing together of a pair of properly mated sheets of bent glass with a sheet of thermoplastic interlayer placed between them with subsequent trimming of the edges of such interlayer to lie flush with the edges of the glass. This stacking operation is preferably carried out with the glass sheets arranged convex surface uppermost, and the assemblies so formed are then mounted on the conveyor 9 the upper span of which starts in the laminating room 31. The conveyor 9 then travels outwardly to a loading station 32 served by operators 33 and 34 positioned on opopsite sides of the conveyor. The conveyor 9 then continues its travel into the oven 16, finally passing out of the remote end of such oven to an unloading station 35 shown in FIGURE 1b, whereupon it commences its return travel beneath the floor 15 of the oven and beneath the support structure 14 back to the laminating room 31 to complete the cyle. Unloading station 35 is served by operators 97 and 98.

An elevated conveyor system is provided for the movement of a series of evacuating units 40. This elevated conveyor system comprises a main supporting I-section rail 41 which extends parallel with the conveyor 9 in vertical alignment with the centre thereof between the loading station 32 and the unloading station 35. A plurality of evacuating units 40 is provided, each such unit being suspended from the rail 41 by two pairs of rollers 42 (see particularly FIGURES 2 and 3). Each unit 40 comprises a framework 43 which carries a motor and pump assembly 44, the pump being connected to evacuate air from pipe 45 which is connected to pipes 46 and 47 that project downwardly from the unit 40, one at each end thereof. Two vacuum gauges 48 having faces directed towards opposite sides of the unit 40 indicate the vacuum in pipes 46 and 47. These pipes are connected together and will always be at the same pressure.

Extending parallel with the supporting rail 41 is a driving chain 49 comprising a series of interconnected links 50 supported by rollers 51 from a further I-section rail 52. Dogs 53 are secured to selected links 50 spaced apart along the length of the chain 49, such dogs 53 projecting downwardly and inwardly towards the rail 41 so as to engage in driving engagement with a plate 54 secured to the framework 43 of each unit 40. Extending along the other side of the main supporting rail 41 on insulators 55 is a shielded conductor rail 56 for supplying power to the motor of the assembly 44. Leads 57 mounted on each of the evacuated units 40 extend to collector brushes that engage the conductor rail 56 in a conventional manner. Each of the units 40 is provided with a manually operable switch 58 which controls supply of power from the leads 57 to the motor in the assembly 44.

The driving chain 49 which consists of links 50 travelling on rail 52 is a slow speed conveyor that moves the units 40 along that part of their travel which lies above the glass conveyor 9. The units 40 are required to travel each in synchronism with a pair of laminated assemblies 30 on the conveyor 9, and an appreciable exposure time to the radiant heat of the oven 16 (from 3 to 6 minutes) is required for the treatment of the assemblies. Accordingly conveyor 9 is comparatively slow speed. On the other hand, a high speed conveyor is employed to effect return of the units 40 from the unloading station 35 to the loading station 32 for reuse. For this purpose, rail 52 carrying chain 49 is caused to diverge from rail 41 which defines the path of travel of the units 40, as soon as the rails 41 and 52 have been curved around through an angle of 180° for the return journey to the loading station 32. This divergence which is shown in FIGURE 1b causes each dog 53 to disengage from its associated plate 54, while simultaneously with such disengagement the plate 54 is engaged by a dog 59 carried by a link 60 of a high speed chain conveyor 61 constituted by a continuous series of such links 60 travelling on a supporting rail 62. The speed of the units 40 along the rail 41 is then increased to about four times the speed of travel of the slow speed chain 49 so that the units 40 are quickly transported to the other end of the return path for re-engagement with the slow speed chain 49 in the vicinity of the loading station 32. This area is seen on the left-hand side of FIGURE 1a. The rail 62 bearing the links 60 carrying dogs 59 diverges from the main support rail 41 at the same place as the rail 52 supporting the low speed chain conveyor 49 converges towards such rail 41. A dog 53 of a link 50 re-engages the plate 54 of each unit 40 and, at this point, the rail 41 curves around again to come to overlie and extend parallel with the glass conveyor 9 at the loading station 32. The low-speed chain 49 passes around tensioning rollers 70, 71, 72 and 73, while the high-speed chain 61 passes around tensioning rollers 74, 75, 76, 77 and 78. The low speed chain 49 is engaged and driven by chain 79 driven by sprocket 80 and passing over idling sprocket 81, and the high speed chain 61 is engaged and driven by chain 82 driven by sprocket 83 and passing over idling sprocket 84. The shafts of driving sprockets 80 and 83 are driven by a source of motive power not shown.

Each of the depending vacuum pipes 46 and 47 of each evacuating unit 40 serves also as a structural frame member, the necessary rigidity being obtained by means of a bar 90 (FIGURE 3), connecting the lower ends of such pipes. Each of the pipes 46 and 47 terminates in a T union 91 from which branch off pipes 92 and 93 ending in tapered nozzles over which are forced the ends of lengths of rubber tubing 94 and 95. Tubes 94 and 95 lead in turn to two substantially diametrically opposite parts of an evacuating member 96 in the form of a continuous loop of rubber of channel section. This channel member 96 is designed to embrace the edge of a laminated glass assembly in the manner best seen in FIGURE 3. A suitable shape for this member is shown in FIGURE 5. Its function in evacuating air from between the glass sheets is more fully described in said prior Patent No. 559,783.

Figure 2:
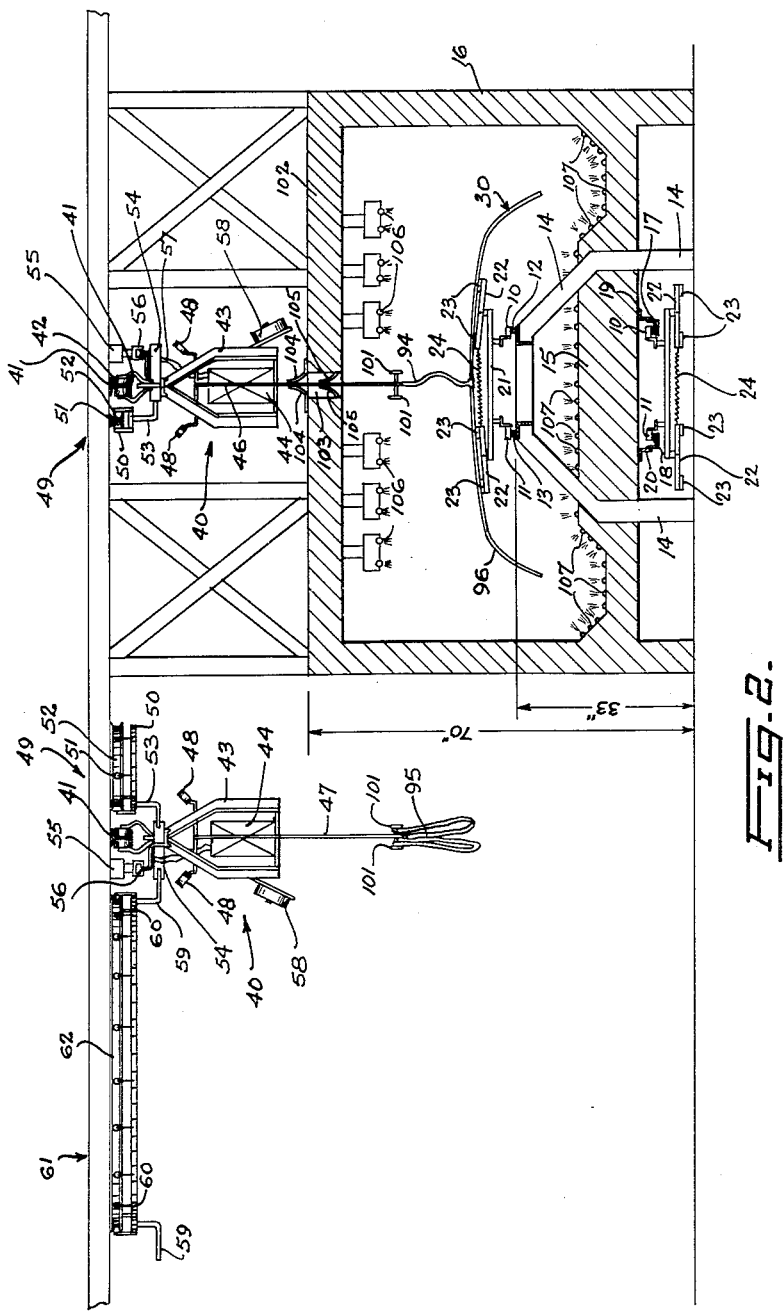
FIGURE 2 is a section on the line II—II in FIGURE 1b.

FIGURES 2 and 3 and parts of FIGURES 1a and 1b of the present drawings show these evacuating members 96 in position on glass assemblies 30. They are placed on the assemblies 30 by operators 33 and 34 at the loading station 32. Each of the evacuating units 40 carries a pair of such evacuating members 96 which is the reason that it is associated with a pair of glass assemblies 30 during the passage of such assemblies through the oven 16. In FIGURE 1a the operators 33 and 34 are seen in the act of just taking hold of one of the members 96 associated with the evacuating unit 40 that has just arrived at the loading station 32. The two operators working together will place such member 96 on one of the two laminated assemblies 30 shown beneath the unit 40, and will co-operate with one another to ensure that such member 96 tightly embraces the edge of its laminated assembly. The operators will then take up and similarly apply the other member 96 to the next laminated assembly 30. Operator 33 will then reach up and push the switch 58 to start the motor of the unit 40, causing the pump thereof to evacuate air from the assemblies 30 through pipes 46 and 47, and 92 and 93, and hence through tubing 94 and 95 and the evacuating members 96. Both operators will glance at their respective vacuum gauges 48 to check that a proper seal of the two members 96 has been obtained and that the desired degree of vacuum is being developed. By this time the two assemblies 30 will have moved forward somewhat on the conveyor 9 and the operators will return to the next pair of laminated assemblies 30 and the next evacuating unit 40 which will by this time be coming into position at the loading station 32.

During passage through the oven 16 the glass assemblies are subjected to radiant heat from the ceiling and/or the floor, such that the glass surface preferably reaches a temperature within the range of 60° C. to 90° C. This is not, however, a uniform temperature through the glass because its time in the oven is insufficient to bring about temperature equilibrium throughout the thickness of the assembly.

After the assemblies have passed from the exit end of the oven 16, shown in FIGURE 1b, the reverse procedure is carried out by operators 97 and 98, evacuating members 96 being removed and the glass assemblies 30 lifted from the conveyor 9 and placed on a second similar conveyor 99 by which they are conveyed through a second oven 100. Alternatively, the conveyor 9 may pass through the second oven 100. The assemblies, with the evacuating members removed, are subjected in the second oven to a surface temperature similar to that experienced at the exit end of the first oven 16. However, in this second oven 100 a more uniform temperature distribution throughout the thickness of each assembly is achieved. This raising of the inner temperature and hence that of the interlayer of each assembly is employed to improve the bond obtained, prior to forwarding the assemblies to the final autoclave sealing step. The second oven also serves to remove any temporary glass edge deformation introduced in the first oven by localized stresses set up by the pressure of and/or thermal effects of the rubber evacuating members employed therein.

After their removal from the glass assemblies, the evacuating members 96 are draped over one or more of a series of projections 101 provided on the bar 90 for this purpose, as shown on the left-hand side of FIGURE 2. In this way they are maintained above the floor and out of contact with any adjacent equipment during the return passage of the evacuating units 40, and are readily available to the loading operators 33 and 34 when the unit 40 returns to the loading station 32.

During the passage of the laminated assemblies through the oven 16, the evacuating units 40 are not subjected to the heat of the oven, since these units pass along above the ceiling 102 of the oven, the pipes 46 and 47 being the only vertical connection. These pipes pass down through a narrow elongated slot 103 (FIGURE 2) in the ceiling 102 which forms part of the wall structure of the oven, such slot 103 having two pairs of spring steel strips 104 and 105 that normally lie pressed tightly against one another but which permit themselves to be forced apart by the pipes 46 and 47. These strips substantially seal the oven, since they are forced apart only at the points where pipes 46 and 47 pass through and for one or two inches in advance and to the rear of each of such pipes. At the entrance to the oven the spring plates 104 and 105 are splayed outwardly to permit the pipes 46 and 47 to gain entry therebetween.

The oven 16 itself is conventional, having overhead radiant heaters 106 and floor radiant heaters 107. Oven 100 is similar.

One aspect of the present invention is the glass supporting apparatus. In its preferred form this apparatus takes the form of four of the pivotally mounted glass-supporting arms 22 arranged with their pivot points defining a rectangle. As already mentioned, with very wide glass panels, six such arms may be used. Such arrangements employing four or six arms 22 are convenient, as providing a very firm support while having the pivoting freedom that enables the apparatus to accommodate itself automatically to different windshield shapes. In certain cases, however, especially when supporting smaller sizes of glass panel, the preferred construction may be dispensed with in favour of a more simplified form. The minimum essential for the supporting apparatus is two pivoted glass-supporting arms for each glass panel. To provide proper support, so that the glass panel will not topple off, these arms should preferably be displaced from one another both longitudinally and transversely of the panel. For example, the apparatus shown in the drawings would support the glass assemblies on either pair of diagonally opposed arms 22 without the other pair, if the unsymmetrical support of the glass is not unacceptable. The ultimate criteria for the two pivoted arms are that their pivotal axes should be displaced from one another, that is must not be coaxial, and that at least one of the glass engaging members 23 of one arm 22 should be displaced horizontally from a line drawn through the glass-engaging members 23 of the other arm 22. This latter requirement eliminates a supporting arrangement consisting of just the two arms 22 mounted on the same support bar 21; such an arrangement would not properly support the glass. It admits, however, as within the invention, an arrangement in which the pivotal axes of the arms are inclined to one another instead of being parallel, and in particular, an arrangement in which the pivotal axes of the two arms are at right angles to each other, one arm extending transversely of the longitudinal extent of the windshield at one end thereof, while the other arm which supports the other end of the windshield extends in the longitudinal direction thereof.

Another possible arrangement employs three supports, two arms 22 disposed on a single bar 21 at respective ends of the glass panel, and a single arm 22 arranged on an adjacent bar 21 centrally of the glass panel in its longitudinal direction.

I claim:

1. A continuous flow manufacturing process for removing air from between the sheets of curved laminated glass assemblies and for effecting a bonding between said sheets, comprising disposing said assemblies in spaced relation to form an elongated series; embracing a narrow marginal portion of the outer surfaces of each assembly around its entire periphery only with an evacuating member; connecting each said evacuating member with one of a plurality of power operated evacuating units; operating each power operated evacuating unit to subject said evacuating member to a subatmospheric pressure; moving said series in its direction of extent to move each said assembly along a first path through a zone at elevated temperature while subjecting said evacuating members to subatmospheric pressure; and moving said evacuating units along a second path extending parallel to said first path through a zone at a temperature substantially below said elevated temperature while operating each said power operated evacuating unit.

2. A process according to claim 1, including the subsequent steps of removing said evacuating member from each said assembly and then further subjecting each said assembly to an elevated temperature at atmospheric pressure.

3. A method of removing air from between the sheets of a curved laminated glass assembly and for effecting a bond between said sheets, comprising subjecting said assembly to an elevated temperature, while subjecting the entire peripheral edge only of said assembly to a subatmospheric pressure, and subsequently subjecting said assembly to an elevated temperature while subjecting said edge to atmospheric pressure.

4. A method of removing air from between the sheets of a curved laminated glass assembly and for effecting a bond between said sheets, comprising embracing a narrow marginal portion of the outer surface of said assembly around its entire periphery only with an evacuating member; subjecting said evacuating member to a subatmospheric pressure; subjecting said assembly to an elevated temperature while said evacuating member is so subjected to subatmospheric pressure; removing said evacuating member from said assembly; and subsequently further subjecting said assembly to an elevated temperature at atmospheric pressure.

5. Apparatus for removing air from between the sheets of curved laminated glass assemblies and for effecting a bonding between said sheets, comprising a heating oven; a conveyor for conveying said assemblies individually along a first path through said oven; a plurality of evacuating members each comprising an endless loop of flexible impervious material of channel cross-section constructed for engagement with a narrow marginal portion of the outer surfaces of a said assembly while enclosing the entire periphery thereof; a plurality of power operated evacuating units for generating a subatmospheric pressure; means for connecting each said evacuating member to a said evacuating unit; a second conveyor for moving said evacuating units individually and synchronously with their respective associated glass assemblies along a second path extending parallel to said first path exteriorly of said oven with said connecting means extending from the exterior to the interior of said oven through a narrow aperture in the wall structure thereof, said aperture being elongated in the direction parallel with said paths.

6. Apparatus for supporting a curved elongated glass panel, comprising a supporting structure, a first elongated glass-supporting arm mounted on a first part of said structure to pivot about a first generally horizontal axis, a pair of spaced-apart, upwardly projecting, glass-engaging members mounted on said arm each on a respective side of said first axis, a second elongated glass-supporting arm mounted on a second part of said structure displaced from said first part to pivot about a second generally horizontal axis displaced from said first axis, and a pair of spaced-apart, upwardly projecting, glass-engaging members mounted on said second arm each on a respective side of said second axis, at least one glass-engaging member of said second arm being displaced horizontally from a line drawn through the glass-engaging members of said first arm.

7. Apparatus for supporting a curved elongated glass panel, comprising a supporting structure, at least three elongated glass-supporting arms each mounted on said structure to pivot about a generally horizontal axis with the points of support of said arms on said structure defining a closed figure of at least three sides, each said arm having a pair of spaced-apart, upwardly projecting, glass-engaging members mounted on said arm each on a respective side of the pivotal axis of said arm.

8. Apparatus for supporting a curved elongated glass panel, comprising a supporting structure, at least four elongated glass-supporting arms, each said arm being mounted on said structure to pivot about a generally horizontal axis and each said arm having a pair of spaced-apart, upwardly projecting, glass-engaging members mounted on said arm each on a respective side of the pivotal axis of said arm, said arms being arranged in pairs, the arms of a pair having their pivotal axes parallel to each other and their glass-engaging members all in alignment with one another, said pairs being arranged in side-by-side relationship with the line joining the glass-engaging members of one pair extending generally parallel with but displaced from the line joining the glass-engaging members of each adjacent pair.

9. Apparatus for removing air from between the sheets of curved laminated glass assemblies and for effecting a bonding between said sheets, comprising a heating oven; a conveyor for conveying said assemblies individually along a first path through said oven, said conveyor comprising a supporting structure, a first elongated glass-supporting arm mounted on a first part of said structure to pivot about a first generally horizontal axis, a pair of spaced-apart, upwardly projecting, glass-engaging members mounted on said arm each on a respective side of said first axis, a second elongated glass-supporting arm mounted on a second part of said structure displaced from said first part to pivot about a second generally horizontal axis displaced from said first axis, and a pair of spaced-apart, upwardly projecting, glass-engaging members mounted on said second arm each on a respective side of said second axis, at least one glass-engaging member of said second arm being displaced horizontally from a line drawn through the glass-engaging members of said first arm; a plurality of evacuating members each comprising an endless loop of flexible impervious material of channel cross-section constructed for engagement with a narrow marginal portion of the outer surfaces of a said assembly while enclosing the entire periphery thereof; a plurality of power operated evacuating units for generating a subatmospheric pressure; means for connecting each said evacuating member to a said evacuating unit; a second conveyor for moving said evacuating units individually and synchronously with their respective associated glass assemblies along a second path extending parallel to said first path exteriorly of said oven with said connecting means extending from the exterior to the interior of said oven through a narrow aperture in the wall structure thereof, said aperture being elongated in the direction parallel with said paths.

10. Apparatus for removing air from between the sheets of curved laminated glass assemblies and for effecting a bonding between said sheets, comprising a loading station; an unloading station; a heating oven; a conveyor for conveying said assemblies individually along a first path extending from said loading station through said oven to said unloading station; a plurality of evacuating members each comprising an endless loop of flexible impervious material of channel cross-section constructed for engagement with a narrow marginal portion of the outer surfaces of a said assembly while enclosing the entire periphery thereof; a plurality of power operated evacuating units for generating a subatmospheric pressure; means for connecting each said evacuating member to a said evacuating unit; a second conveyor for moving said evacuating units individually and synchronously with their respective associated glass assemblies along a second path extending parallel to said first path from said loading station to said unloading station exteriorly of said oven with said connecting means extending from the exterior to the interior of said oven through a narrow aperture in the wall structure thereof, said aperture being elongated in the direction parallel with said paths, a third conveyor for returning said evacuating units from said unloading station to said loading station, and means for driving said third conveyor at a substantially greater speed than said first and second conveyors.

11. Apparatus for conveying a curved elongated glass panel comprising a pair of parallel chains movable through a cyclic path, means for supporting said pair of chains in a substantially horizontal top run of said cyclic path, a first support member extending transversely between said chains and secured thereto, a first elongated glass-supporting arm mounted adjacent an end of said first support member to pivot about a first horizontal axis parallel to the direction of travel of said chains in said top run, a pair of spaced-apart upwardly projecting, glass-engaging members mounted on said arm each on a respective side of said first axis, a second support member extending transversely between said chains and secured thereto, said second support member being spaced from said first support member, a second elongated glass-supporting arm mounted adjacent the end of said second support member farthest removed from the end of said first support member on which is mounted said first elongated glass-supporting arm, to pivot about a second horizontal axis parallel to the direction of travel of said chains in said top run, and a pair of spaced-apart upwardly projecting, glass-engaging members mounted on said second arm each on a respective side of said second axis.

References Cited in the file of this patent

UNITED STATES PATENTS

| | | |
|---|---|---|
| 1,905,189 | Sherts | Apr. 25, 1933 |
| 2,028,927 | Sherts | Jan. 28, 1936 |
| 2,028,928 | Sherts | Jan. 28, 1936 |
| 2,046,446 | Carlisle | July 7, 1936 |
| 2,733,789 | Tolle | Feb. 7, 1956 |

FOREIGN PATENTS

| | | |
|---|---|---|
| 614,616 | Germany | June 15, 1935 |
| 210,104 | Australia | July 29, 1957 |